(12) United States Patent
Xiang (10) Patent No.: US 10,097,305 B2
(45) Date of Patent: Oct. 9, 2018

(54) ADD/DROP MULTIPLEXER AND METHOD FOR PROCESSING SIGNAL IN ADD/DROP MULTIPLEXER

(71) Applicant: Huawei Technologies Co., Ltd., Shenzhen, Guangdong (CN)

(72) Inventor: Hui Xiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/782,745

(22) Filed: Oct. 12, 2017

(65) Prior Publication Data

US 2018/0041300 A1 Feb. 8, 2018

Related U.S. Application Data

(63) Continuation of application No. PCT/CN2015/076781, filed on Apr. 16, 2015.

(51) Int. Cl.
*H04Q 11/00* (2006.01)
*H04J 14/02* (2006.01)

(52) U.S. Cl.
CPC ...... *H04J 14/0215* (2013.01); *H04Q 11/0071* (2013.01); *H04Q 2011/0088* (2013.01); *H04Q 2213/13003* (2013.01)

(58) Field of Classification Search
CPC ............. H04J 14/0215; H04Q 11/0071; H04Q 2011/0088; H04Q 2213/13003
USPC .......................................................... 398/74
See application file for complete search history.

(56) References Cited

U.S. PATENT DOCUMENTS

| | | | | | |
|---|---|---|---|---|---|
| 5,953,141 A | * | 9/1999 | Liu | ...................... | H04J 14/0206 385/24 |
| 6,233,074 B1 | * | 5/2001 | Lahat | .................. | H04J 14/0212 398/79 |
| 2003/0128985 A1 | * | 7/2003 | Elbers | ................. | H04J 14/0206 398/83 |

(Continued)

FOREIGN PATENT DOCUMENTS

| CN | 1467930 A | 1/2004 |
|---|---|---|
| CN | 1852051 A | 10/2006 |

(Continued)

OTHER PUBLICATIONS

Gringeri et al.; "Flexible Architectures for Optical Transport Nodes and Networks"; IEEE Communications Magazine; vol. 48, No. 7; Jul. 2010; 12 pages.

*Primary Examiner* — Dalzid Singh (57) ABSTRACT

The present application discloses an add/drop multiplexer, including a first line board and a tributary board, where the first line board includes at least a first interface and a second interface, the first interface is disposed between the tributary board and the first line board, and the second interface is disposed on a network side of the first line board; the first line board is configured to output a first signal received from a first link through the second interface; the first line board is configured to output a second signal received from the first link to the tributary board through the first interface; and the first line board is configured to receive a third signal from the tributary board through the first interface, and input the third signal into the first link. An inter-board interface on a link is effectively eliminated, thereby improving a link bandwidth of a device.

10 Claims, 5 Drawing Sheets

(56) References Cited

U.S. PATENT DOCUMENTS

| | | | |
|---|---|---|---|
| 2003/0172319 A1 | 9/2003 | Ryhorchuk et al. | |
| 2005/0063396 A1* | 3/2005 | Yu | H04J 3/085 370/401 |
| 2006/0228114 A1 | 10/2006 | Caroli | |
| 2008/0292310 A1 | 11/2008 | Li | |
| 2011/0116788 A1 | 5/2011 | Ren | |
| 2011/0142448 A1* | 6/2011 | Zou | H04Q 11/0067 398/58 |
| 2012/0163796 A1 | 6/2012 | Wang et al. | |
| 2012/0294618 A1 | 11/2012 | Yu et al. | |
| 2014/0056593 A1 | 2/2014 | Deandrea et al. | |

FOREIGN PATENT DOCUMENTS

| | | |
|---|---|---|
| CN | 101321031 A | 12/2008 |
| CN | 101645750 A | 2/2010 |
| CN | 101656894 A | 2/2010 |
| CN | 102790653 A | 11/2012 |
| CN | 103856258 A | 6/2014 |
| GB | 2427518 A | 12/2006 |
| JP | 2009159033 A | 7/2009 |
| WO | 9852314 A2 | 11/1998 |

\* cited by examiner

ADD/DROP MULTIPLEXER AND METHOD FOR PROCESSING SIGNAL IN ADD/DROP MULTIPLEXER

CROSS-REFERENCE TO RELATED APPLICATIONS

This application is a continuation of International Application No. PCT/CN2015/076781, filed on Apr. 16, 2015, the disclosure of which is hereby incorporated by reference in its entirety.

TECHNICAL FIELD

The present application relates to the communications field, and in particular, to an add/drop multiplexer and a method for processing a signal in an add/drop multiplexer.

BACKGROUND

In a transport network system, a signal flow needs to be "dropped" from a node, or a signal flow needs to be "added" to a node. A device that "drops" and "adds" a signal flow is referred to as an add/drop multiplexer (ADM). The ADM includes an optical add/drop multiplexer (OADM) and an electrical add/drop multiplexer (EADM).

Figure 1:
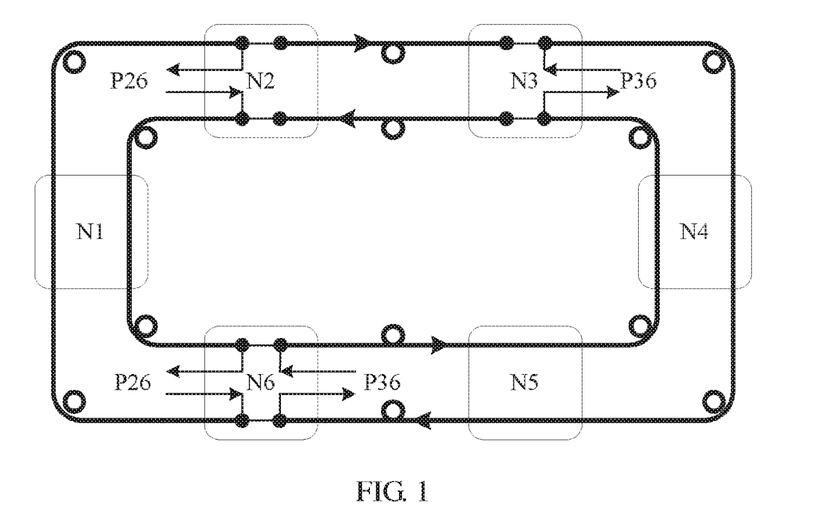
FIG. 1 is a structural diagram of a transport network system in the prior art.
Figure 2:
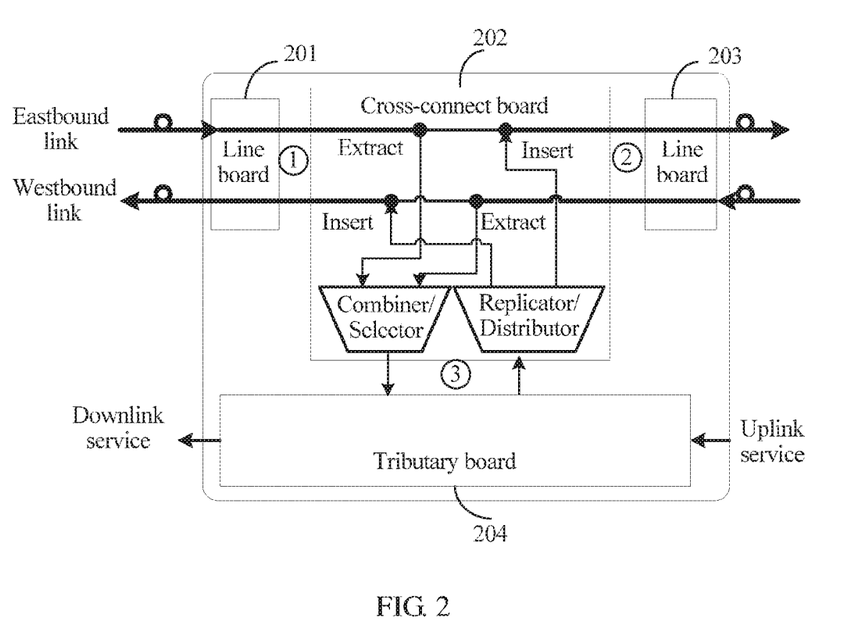
FIG. 2 is a schematic structural diagram of an add/drop multiplexer in the prior art.

Due to exchangeability of communication information, a transport network is generally bidirectional, as shown in FIG. 1. A service P26 between a node N2 and a node N6 is bidirectional communication information, is added and dropped by using ADMs of the nodes, and passes through an ADM of a node N1. Similarly, a service P36 between a node N3 and the node N6 is bidirectional communication information, is added and dropped by using ADMs of the nodes, and passes through ADMs of a node N4 and a node N5. As shown in FIG. 2, an ADM generally includes a line board (Line Card) 201, a cross-connect board (Switch Card) 202, a line board 203, and a tributary board (Tribute Card) 204. The boards are independent boards, which is convenient for maintenance. When a board is faulty, communication on an entire link may not be affected. The boards are connected to each other through an inter-board interface. A signal on an eastbound link is input into the line board 201, is processed and then sent in a downlink direction to the cross-connect board 202 through an inter-board interface (1), is sent in the downlink direction to the line board 203 through an inter-board interface (2), and is processed and then output to an egress of the eastbound link. A signal on a westbound link is input into the line board 203, is processed and then sent in a downlink direction to the cross-connect board 202 through the inter-board interface (2), is sent in the downlink direction to the line board 201 through the inter-board interface (1), and is processed and then output to an egress of the westbound link. After the cross-connect board 202 receives the input signal on the eastbound link from the line board 201 through the inter-board interface (1), or receives the input signal on the westbound link from the line board 203 through the inter-board interface (2), a downlink service of a current node is extracted from a signal flow on the eastbound link and/or a signal flow on the westbound link, is processed by using a combiner/selector and then sent to the tributary board 204 through an inter-board interface (3), and is transferred to a device on a client side. The cross-connect board 202 receives an uplink service of the current node from the tributary board 204 through the inter-board interface (3). The uplink service of the current node is processed by using a replicator/distributor and then inserted into the signal flow on the eastbound link and/or the signal flow on the westbound link, and enters the line board 203 through the inter-board interface (2), or enters the line board 201 through the inter-board interface (1), to form an output signal on the eastbound/westbound link.

Because there is an inter-board interface between the line board and the cross-connect board of the ADM, and the eastbound/westbound link passes through the inter-board interface between the line board and the cross-connect board, a link bandwidth processing capability of the ADM is limited to bandwidth of the inter-board interface between the line board and the cross-connect board, and a maximum of the link bandwidth processing capability of the ADM does not exceed the bandwidth of the inter-board interface between the line board and the cross-connect board.

SUMMARY

In view of this, embodiments of the present disclosure provide an add/drop multiplexer and a method for processing a signal in an add/drop multiplexer, which can resolve a problem that a link bandwidth processing capability of the ADM is limited to bandwidth of an inter-board interface.

According to a first aspect, an embodiment of the present disclosure provides an add/drop multiplexer, where the add/drop multiplexer includes a first line board and a tributary board, where the first line board includes at least a first interface and a second interface, the first interface is disposed between the tributary board and the first line board, and the second interface is disposed on a network side of the first line board; the first line board is configured to receive a first signal from a first link, and output the first signal through the second interface; the first line board is further configured to receive a second signal from the first link, and output the second signal to the tributary board through the first interface; and the first line board is further configured to receive a third signal from the tributary board through the first interface, and input the third signal into the first link.

With reference to the first aspect, in a first possible implementation manner of the first aspect, the add/drop multiplexer further includes a second line board, where the second line board includes at least a third interface and a fourth interface, the third interface is disposed between the tributary board and the second line board, and the fourth interface is disposed on a network side of the second line board; the second line board is configured to receive a fourth signal from a second link, and output the fourth signal through the fourth interface; the second line board is further configured to receive a fifth signal from the second link, and output the fifth signal to the tributary board through the third interface; and the second line board is further configured to receive a sixth signal from the tributary board through the third interface, and input the sixth signal into the second link.

With reference to the first aspect or the first possible implementation manner of the first aspect, in a second possible implementation manner of the first aspect, the tributary board is disposed on either side of the first line board and the second line board, or the tributary board is disposed on a same side of the first line board and the second line board.

With reference to the first aspect, or either the first or the second possible implementation manner of the first aspect, in a third possible implementation manner of the first aspect, the tributary board further includes a combiner/selector and a replicator/distributor; the tributary board is configured to receive the second signal from the first line board, generate a downlink service by using the combiner/selector, and send the downlink service to a client device; and the tributary board is further configured to receive an uplink service from the client device, generate the third signal by using the replicator/distributor, and input the third signal into the first line board.

With reference to the first aspect, or any one of the first to the third possible implementation manners of the first aspect, in a fourth possible implementation manner of the first aspect, the add/drop multiplexer further includes a third line board, where a combiner/selector and a replicator/distributor of the tributary board are integrated into the third line board, the third line board includes at least a fifth interface and a sixth interface, the fifth interface is disposed between the first line board and the third line board, and the sixth interface is disposed on a network side of the third line board; the third line board is configured to receive a seventh signal from a third link, and output the seventh signal through the sixth interface; the third line board is further configured to receive an eighth signal from the third link, and output, to the first line board through the fifth interface, the eighth signal after the eighth signal passes through the replicator/distributor; and the third line board is further configured to receive a ninth signal from the first line board through the fifth interface, and input the ninth signal into the third link by using the combiner/selector.

According to a second aspect, an embodiment of the present disclosure provides a method for processing a signal in an add/drop multiplexer, where the method includes: receiving, by a first line board, a first signal from a first link, and outputting the first signal through a second interface, where the second interface is disposed on a network side of the first line board; receiving, by the first line board, a second signal from the first link, and outputting the second signal to the tributary board through a first interface, where the first interface is disposed between the tributary board and the first line board; and receiving, by the first line board, a third signal from the tributary board through the first interface, and inputting the third signal into the first link.

With reference to the second aspect, in a first possible implementation manner of the second aspect, the method further includes: receiving, by a second line board, a fourth signal from a second link, and outputting the fourth signal through a fourth interface, where the fourth interface is disposed on a network side of the second line board; receiving, by the second line board, a fifth signal from the second link, and outputting the fifth signal to the tributary board through a third interface, where the third interface is disposed between the tributary board and the second line board; and receiving, by the second line board, a sixth signal from the tributary board through the third interface, and inputting the sixth signal into the second link.

With reference to the second aspect, or the first possible implementation manner of the second aspect, in a second possible implementation manner of the second aspect, the tributary board receives the second signal from the first line board, generates a downlink service by using a combiner/selector on the tributary board, and sends the downlink service to a client device; and the tributary board receives an uplink service from the client device, generates the third signal by using a replicator/distributor on the tributary board, and inputs the third signal into the first line board.

With reference to the second aspect, or either the first or the second possible implementation manner of the second aspect, in a third possible implementation manner of the second aspect, the method further includes: receiving, by a third line board, a seventh signal from a third link, and outputting the seventh signal through a sixth interface, where the sixth interface is disposed on a network side of the third line board; receiving, by the third line board, an eighth signal from the third link, and outputting, to the first line board through a fifth interface, the eighth signal after the eighth signal passes through the replicator/distributor, where the fifth interface is disposed between the first line board and the third line board; and receiving, by the third line board, a ninth signal from the first line board through the fifth interface, and inputting the ninth signal into the third link by using the combiner/selector.

According to technical solutions provided in the embodiments of the present disclosure, a line board is configured to receive a link signal, and the link signal is output after passing through the line board. There is an inter-board interface between the line board and a tributary board or between different line boards. A downlink service extracted by the line board is output from the inter-board interface, and an uplink service inserted by the line board is input from the inter-board interface. An inter-board interface on a link is effectively eliminated, thereby reducing complexity, power consumption, and costs of an ADM, and improving a link bandwidth processing capability of the device.

BRIEF DESCRIPTION OF DRAWINGS

To describe the technical solutions in the embodiments of the present disclosure or in the prior art more clearly, the following briefly introduces the accompanying drawings required for describing the background and the embodiments.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Embodiment 1

Figure 3A:
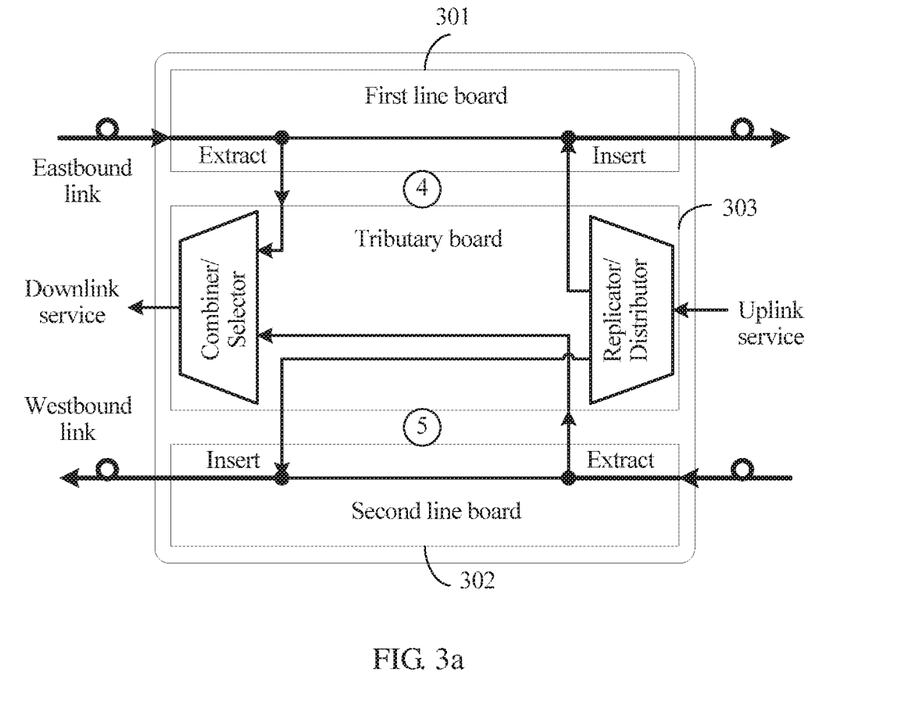
FIG. 3a is a schematic structural diagram for implementing an ADM according to an embodiment of the present disclosure.
Figure 3B:
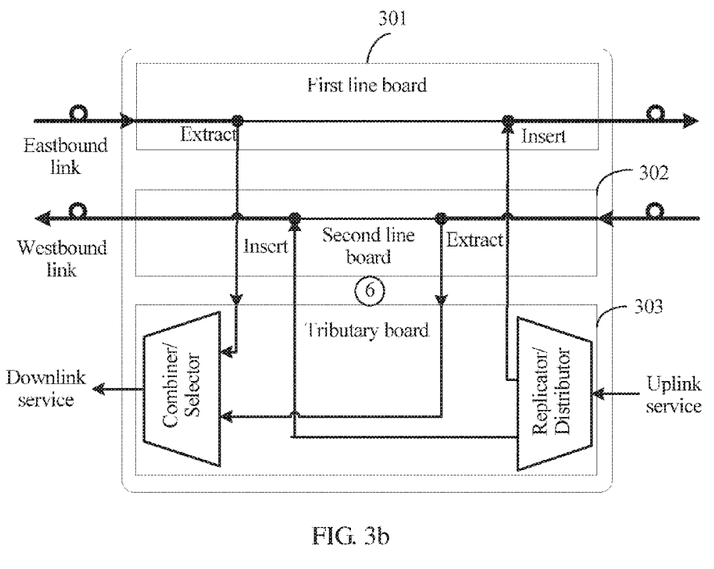
FIG. 3b is a schematic structural diagram for implementing another ADM according to an embodiment of the present disclosure.

FIG. 3a is a schematic structural diagram of an ADM according to an embodiment of the present disclosure. The ADM in this embodiment exists on a node on a transport network. As shown in FIG. 3a and FIG. 3b, the ADM includes a first line board 301, a second line board 302, and a tributary board 303. The first line board 301 and the second line board 302 may have standby boards, and therefore, the ADM may include at least one first line board 301 and at least one second line board 302. The tributary board is provided with at least one combiner/selector and at least one replicator/distributor. The combiner/selector and the replicator/distributor may be optical/electrical switches. As shown in FIG. 3a, the tributary board 303 is disposed on different sides of the first line board 301 and the second line board 302. The tributary board 303 and the first line board 301 are connected to each other through an inter-board interface (4), and the tributary board 303 and the second line board 302 are connected to each other through an inter-board interface (5). Optionally, as shown in FIG. 3b, the tributary board 303 may be further disposed on a same side of the first line board 301 and the second line board 302, and is interconnected to the first line board 301 and the second line board 302 through an inter-board interface (6).

The embodiment in FIG. 3a is used as an example for description. In a specific implementation process, the first line board 301 receives an input signal on an eastbound link. A downlink service of a current node is extracted from the signal flow on the eastbound link, is transmitted to the combiner/selector on the tributary board 303 through the inter-board interface (4), and is further transmitted to a device on a client side after combination/selection processing is performed on the downlink service. In addition, an uplink service that is of the current node and comes from the device on the client side is received from the tributary board 303, and is inserted into the signal flow on the eastbound link through the inter-board interface (4) after replication/distribution processing is performed on the uplink service by using the replicator/distributor on the tributary board 303, to form an output signal on the eastbound link. Further, the first line board 301 outputs, from a network side interface, the output signal that is on the eastbound link and is obtained after extraction or insertion processing is performed. The second line board 302 receives an input signal on a westbound link. A downlink service of the current node is extracted from the signal flow on the westbound link, is transmitted to the combiner/selector on the tributary board 303 through the inter-board interface (5), and is further transmitted to the device on the client side after combination/selection processing is performed on the downlink service. In addition, an uplink service that is of the current node and comes from the device on the client side is received from the tributary board 303, and is inserted into the signal flow on the westbound link through the inter-board interface (5) after replication/distribution processing is performed on the uplink service by using the replicator/distributor on the tributary board 303, to form an output signal on the westbound link. Further, the second line board 302 outputs, from a network side interface, the output signal that is on the westbound link and is obtained after extraction or insertion processing is performed. Specifically, the device on the client side includes a router or a switching device.

Specifically, when the ADM is an OADM, signal flows on the eastbound link and the westbound link may be wavelength signals or sub-wavelength signals, and downlink services extracted from the signal flows on the eastbound link and the westbound link and uplink services inserted into the signal flows on the eastbound link and the westbound link may be wavelength signals or sub-wavelength signals. In addition, extracting the downlink services from the signal flows on the eastbound link and the westbound link and inserting the uplink services into the signal flows on the eastbound link and the westbound link may be implemented by using a wavelength selector. When the ADM is an EADM, signal flows on the eastbound link and the westbound link may be timeslot signals, and downlink services extracted from the signal flows on the eastbound link and the westbound link and uplink services inserted into the signal flows on the eastbound link and the westbound link may be timeslot signals. In addition, extracting the downlink services from the signal flows on the eastbound link and the westbound link and inserting the uplink services into the signal flows on the eastbound link and the westbound link may be implemented by using a timeslot selector.

A specific implementation process of an embodiment in FIG. 3b is similar to that of the embodiment in FIG. 3a, and details are not repeatedly described herein.

In this embodiment, a line board is configured to receive an eastbound/westbound link signal, and the eastbound/westbound link signal is output after passing through the line board. There is an inter-board interface between the line board and a tributary board. A downlink service extracted by the line board is output from the inter-board interface, and an uplink service inserted by the line board is input from the inter-board interface. An inter-board interface on the eastbound link and an inter-board interface on the westbound link are effectively eliminated, thereby reducing complexity, power consumption, and costs of an ADM, and improving a link bandwidth processing capability of a device.

Embodiment 2

Figure 4:
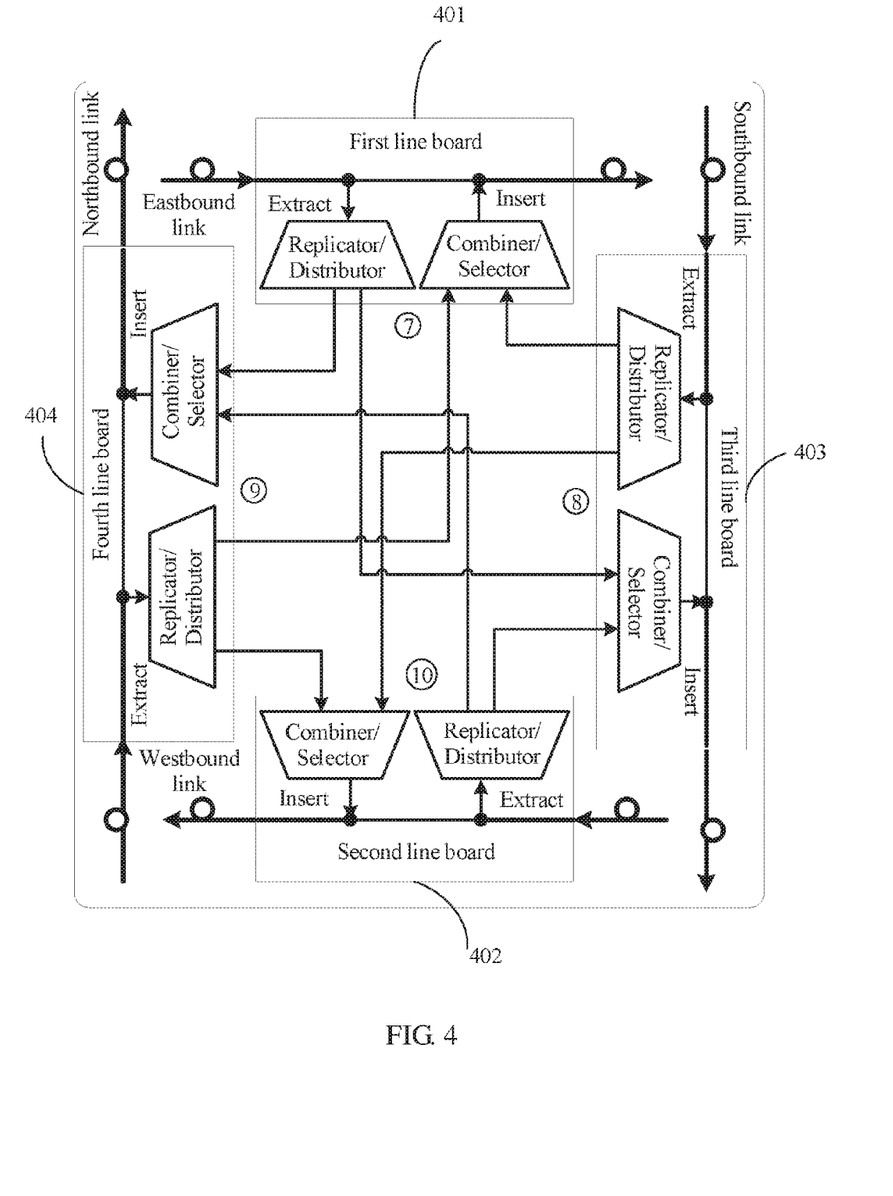
FIG. 4 is a schematic structural diagram for implementing still another ADM according to an embodiment of the present disclosure.

FIG. 4 is a schematic structural diagram of another ADM according to an embodiment of the present disclosure. This embodiment is applied to a scenario in which link information on two transport networks is exchanged. That is, a signal flow on an eastbound link, a signal flow on a southbound link, and a signal flow on a northbound link are exchanged; and a signal flow on a westbound link, the signal flow on the southbound link, and the signal flow on the northbound link are exchanged. As shown in FIG. 4, the ADM includes a first line board 401, a second line board 402, a third line board 403, and a fourth line board 404, where: the first line board 401, the second line board 402, the third line board 403, and the fourth line board 404 are independent boards; and the first line board 401, the second line board 402, the third line board 403, and the fourth line board 404 may each have at least one standby line board. The first line board 401 and the third line board 403 are connected to each other through inter-board interfaces (7) and (8), and the first line board 401 and the fourth line board 404 are connected to each other through inter-board interfaces (7) and (9). The second line board 402 and the third line board 403 are connected to each other through inter-board interfaces (8) and (10), and the second line board 402 and the fourth line board 404 are connected to each other through inter-board interfaces (9) and (10). Each of the first line board 401, the second line board 402, the third line board 403, and the fourth line board 404 is provided with at least one combiner/selector and at least one replicator/distributor. The combiner/selector and the replicator/distributor may be optical/electrical switches.

In a specific implementation process, the eastbound link passes through the first line board 401. The first line board 401 receives an input signal on the eastbound link, extracts a downlink service of a current node from the signal flow on the eastbound link, and then performs replication/distribution processing on the downlink service by using the replicator/distributor, where the extracted downlink service is separately sent in a downlink direction to the third line board 403 and/or the fourth line board 404. The first line board 401 receives an uplink service from the third line board 403 and/or the fourth line board 404 by using the combiner/selector, and inserts the uplink service into the signal flow on the eastbound link to form an output signal on the eastbound link. Further, the first line board 401 outputs, from a network side interface, the output signal that is on the eastbound link and is obtained after extraction or insertion processing is performed.

The westbound link passes through the second line board 402. The second line board 402 receives an input signal on the westbound link, extracts a downlink service of the current node from the signal flow on the westbound link, and then performs replication/distribution processing on the downlink service by using the replicator/distributor, where the extracted downlink service is separately sent in the downlink direction to the third line board 403 and/or the fourth line board 404. The second line board 402 receives an uplink service from the third line board 403 and/or the fourth line board 404 by using the combiner/selector, and inserts the uplink service into the signal flow on the westbound link to form an output signal on the westbound link. Further, the second line board 402 outputs, from a network side interface, the output signal that is on the westbound link and is obtained after extraction or insertion processing is performed.

The southbound link passes through the third line board 403. The third line board 403 receives an input signal on the southbound link, extracts a downlink service of the current node from the signal flow on the southbound link, and then performs replication/distribution processing on the downlink service by using the replicator/distributor, where the extracted downlink service is separately sent in the downlink direction to the first line board 401 and/or the second line board 402. The third line board 403 receives an uplink service from the first line board 401 and/or the second line board 402 by using the combiner/selector, and inserts the uplink service into the signal flow on the southbound link to form an output signal on the southbound link. Further, the third line board 403 outputs, from a network side interface, the output signal that is on the southbound link and is obtained after extraction or insertion processing is performed.

The northbound link passes through the fourth line board 404. The fourth line board 404 receives an input signal on the northbound link, extracts a downlink service of the current node from the signal flow on the northbound link, and then performs replication/distribution processing on the downlink service by using the replicator/distributor, where the extracted downlink service is separately sent in the downlink direction to the first line board 401 and/or the second line board 402. The fourth line board 404 receives an uplink service from the first line board 401 and/or the second line board 402 by using the combiner/selector, and inserts the uplink service into the signal flow on the northbound link to form an output signal on the northbound link. Further, the fourth line board 404 outputs, from a network side interface, the output signal that is on the northbound link and is obtained after extraction or insertion processing is performed.

Specifically, when the ADM is an OADM, signal flows on the eastbound link, the westbound link, the southbound link, and the northbound link may be wavelength signals or sub-wavelength signals, and downlink services extracted from the signal flows on the eastbound link, the westbound link, the southbound link, and the northbound link and uplink services inserted into the signal flows on the eastbound link, the westbound link, the southbound link, and the northbound link may be wavelength signals or sub-wavelength signals. In addition, extracting the downlink services from the eastbound link, the westbound link, the southbound link, and the northbound link and inserting the uplink services into the eastbound link, the westbound link, the southbound link, and the northbound link may be implemented by using a wavelength selector. When the ADM is an EADM, signal flows on the eastbound link, the westbound link, the southbound link, and the northbound link may be timeslot signals, and downlink services extracted from the signal flows on the eastbound link, the westbound link, the southbound link, and the northbound link and uplink services inserted into the signal flows on the eastbound link, the westbound link, the southbound link, and the northbound link may be timeslot signals. In addition, extracting the downlink services from the eastbound link, the westbound link, the southbound link, and the northbound link and inserting the uplink services into the eastbound link, the westbound link, the southbound link, and the northbound link may be implemented by using a timeslot selector.

In this embodiment, an eastbound link passes through a first line board, a westbound link passes through a second line board, a southbound link passes through a third line board, and a northbound link passes through a fourth line board. Through inter-board interfaces, service signal flows are extracted and inserted between the first line board and the third line board, between the first line board and the fourth line board, between the second line board and the third line board, and between the second line board and the fourth line board. An inter-board interface on the eastbound link, an inter-board interface on the westbound link, an inter-board interface on the southbound link, and an inter-board interface on the northbound link are effectively eliminated, thereby reducing complexity, power consumption, and costs of an ADM, and improving a link bandwidth processing capability of a device.

Embodiment 3

Figure 5:
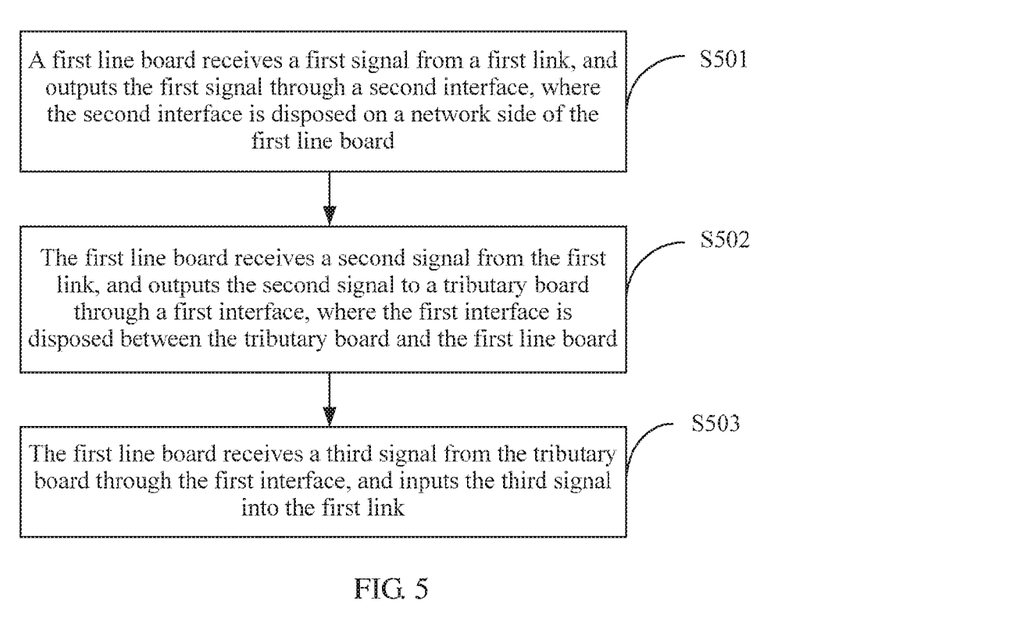
FIG. 5 is an exemplary flowchart for implementing a method for processing a signal in an add/drop multiplexer in the present disclosure.

FIG. 5 is an exemplary flowchart of a method for processing a signal in an add/drop multiplexer according to an embodiment of the present disclosure. As shown in FIG. 5, the add/drop multiplexer may be an optical add/drop multiplexer OADM and an electrical add/drop multiplexer EADM, and specifically executes the following steps:

S501. A first line board receives a first signal from a first link, and outputs the first signal through a second interface, where the second interface is disposed on a network side of the first line board.

S502. The first line board receives a second signal from the first link, and outputs the second signal to the tributary board through a first interface, where the first interface is disposed between the tributary board and the first line board.

S503. The first line board receives a third signal from the tributary board through the first interface, and inputs the third signal into the first link.

In a specific implementation process, the add/drop multiplexer may further include a second line board. The second line board receives a fourth signal from a second link, and outputs the fourth signal through a fourth interface, where the fourth interface is disposed on a network side of the second line board; the second line board receives a fifth signal from the second link, and outputs the fifth signal to the tributary board through a third interface, where the third interface is disposed between the tributary board and the second line board; and the second line board receives a sixth signal from the tributary board through the third interface, and inputs the sixth signal into the second link.

The add/drop multiplexer may further include the tributary board. The tributary board receives the second signal from the first line board, generates a downlink service by using a combiner/selector on the tributary board, and sends the downlink service to a client device; and the tributary board receives an uplink service from the client device, generates the third signal by using a replicator/distributor on the tributary board, and inputs the third signal into the first line board.

The add/drop multiplexer may further include a third line board. The third line board receives a seventh signal from a third link, and outputs the seventh signal through a sixth interface, where the sixth interface is disposed on a network side of the third line board; the third line board is further configured to receive an eighth signal from the third link, and output, to the first line board through a fifth interface, the eighth signal after the eighth signal passes through a replicator/distributor, where the fifth interface is disposed between the first line board and the third line board; and the third line board is further configured to receive a ninth signal from the first line board through the fifth interface, and input the ninth signal into the third link by using a combiner/selector.

In this embodiment, a line board of an add/drop multiplexer is configured to receive a link signal, and the link signal is output after passing through the line board. There is an inter-board interface between the line board and a tributary board or between different line boards. A downlink service extracted by the line board is output from the inter-board interface, and an uplink service inserted by the line board is input from the inter-board interface. An inter-board interface on a link is effectively eliminated, thereby reducing complexity, power consumption, and costs of the ADM, and improving a link bandwidth processing capability of a device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The foregoing are merely some embodiments of the present disclosure. A person skilled in the art may make various modifications and variations to the present disclosure without departing from the spirit and scope of the present disclosure.

What is claimed is:

1. An add/drop multiplexer, comprising:
    a tributary board; and
    a first line board comprising at least a first interface and a second interface, the first interface is disposed between the tributary board and the first line board, and the second interface is disposed on a network side of the first line board, and wherein the first line board is configured to:
        receive a first signal from a first link, and output the first signal through the second interface,
        receive a second signal from the first link, and output the second signal to the tributary board through the first interface, and
        receive a third signal from the tributary board through the first interface, and input the third signal into the first link.

2. The add/drop multiplexer according to claim 1, further comprising:
    a second line board comprising at least a third interface and a fourth interface, the third interface is disposed between the tributary board and the second line board, and the fourth interface is disposed on a network side of the second line board, and wherein the second line board is configured to:
        receive a fourth signal from a second link, and output the fourth signal through the fourth interface;
        receive a fifth signal from the second link, and output the fifth signal to the tributary board through the third interface; and
        receive a sixth signal from the tributary board through the third interface, and input the sixth signal into the second link.

3. The add/drop multiplexer according to claim 1, wherein the tributary board is disposed on either side of the first line board and the second line board.

4. The add/drop multiplexer according to claim 1, wherein the tributary board is disposed on a same side of the first line board and the second line board.

5. The add/drop multiplexer according to claim 1, wherein:
    the tributary board further comprises a combiner/selector and a replicator/distributor; and
    the tributary board is configured to:
        receive the second signal from the first line board,
        generate a downlink service by using the combiner/selector,
        send the downlink service to a client device,
        receive an uplink service from the client device,
        generate the third signal by using the replicator/distributor, and
        input the third signal into the first line board.

6. The add/drop multiplexer according to claim 1, further comprising:
    a third line board having a combiner/selector and a replicator/distributor of the tributary board integrated into the third line board, and comprising at least a fifth interface and a sixth interface, the fifth interface is disposed between the first line board and the third line board, and the sixth interface is disposed on a network side of the third line board, and wherein the third line board is configured to:
        receive a seventh signal from a third link, and output the seventh signal through the sixth interface;
        receive an eighth signal from the third link;
        output, to the first line board through the fifth interface, the eighth signal after the eighth signal passes through the replicator/distributor;
        receive a ninth signal from the first line board through the fifth interface; and input the ninth signal into the third link by using the combiner/selector.

7. A method for processing a signal in an add/drop multiplexer, the method comprising:
- receiving, by a first line board, a first signal from a first link, and outputting the first signal through a second interface, wherein the second interface is disposed on a network side of the first line board;
- receiving, by the first line board, a second signal from the first link, and outputting the second signal to a tributary board through a first interface, wherein the first interface is disposed between the tributary board and the first line board; and
- receiving, by the first line board, a third signal from the tributary board through the first interface, and inputting the third signal into the first link.

8. The method according to claim 7, further comprising:
- receiving, by a second line board, a fourth signal from a second link, and outputting the fourth signal through a fourth interface, wherein the fourth interface is disposed on a network side of the second line board;
- receiving, by the second line board, a fifth signal from the second link, and outputting the fifth signal to the tributary board through a third interface, wherein the third interface is disposed between the tributary board and the second line board; and
- receiving, by the second line board, a sixth signal from the tributary board through the third interface, and inputting the sixth signal into the second link.

9. The method according to claim 7, wherein:
- receiving, by the tributary board, the second signal from the first line board;
- generating, a downlink service using a combiner/selector on the tributary board, and sending the downlink service to a client device; and
- receiving, by the tributary board, an uplink service from the client device;
- generating the third signal using a replicator/distributor on the tributary board, and inputting the third signal into the first line board.

10. The method according to claim 7, further comprising:
- receiving, by a third line board, a seventh signal from a third link, and outputting the seventh signal through a sixth interface, wherein the sixth interface is disposed on a network side of the third line board;
- receiving, by the third line board, an eighth signal from the third link, and outputting, to the first line board through a fifth interface, the eighth signal after the eighth signal passes through a replicator/distributor, wherein the fifth interface is disposed between the first line board and the third line board; and
- receiving, by the third line board, a ninth signal from the first line board through the fifth interface, and inputting the ninth signal into the third link by using a combiner/selector.

* * * * *